United States Patent
Kobayashi

(10) Patent No.: US 8,432,837 B2
(45) Date of Patent: Apr. 30, 2013

(54) APPARATUS AND METHOD FOR FRAME SYNCHRONIZATION TIMING DETECTION AND MOBILE TERMINAL

(75) Inventor: Hiroki Kobayashi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 201 days.

(21) Appl. No.: 12/359,669

(22) Filed: Jan. 26, 2009

(65) Prior Publication Data
US 2009/0190510 A1    Jul. 30, 2009

(30) Foreign Application Priority Data

Jan. 25, 2008 (JP) ................. 2008-014889

(51) Int. Cl.
*H04J 3/00* (2006.01)
*H04W 4/00* (2009.01)

(52) U.S. Cl.
USPC ......................... 370/280; 370/314

(58) Field of Classification Search .............. 370/280, 370/208, 314
See application file for complete search history.

(56) References Cited

U.S. PATENT DOCUMENTS

| | | | |
|---|---|---|---|
| 5,680,421 A * | 10/1997 | Shiino et al. ................ | 375/368 |
| 6,192,056 B1 | 2/2001 | Tsuruoka | |
| 6,633,753 B1 | 10/2003 | Kido | |
| 7,110,387 B1 * | 9/2006 | Kim et al. .................... | 370/344 |
| 7,194,055 B2 | 3/2007 | Tandai et al. | |
| 7,430,193 B2 | 9/2008 | Kim et al. | |
| 7,613,104 B2 * | 11/2009 | Bhatt et al. .................. | 370/208 |
| 7,801,180 B2 * | 9/2010 | Cai et al. ..................... | 370/474 |
| 2004/0196872 A1 * | 10/2004 | Nakamura ................... | 370/512 |
| 2006/0126491 A1 * | 6/2006 | Ro et al. ...................... | 370/208 |
| 2007/0064586 A1 * | 3/2007 | Ma et al. ..................... | 370/203 |
| 2008/0192866 A1 * | 8/2008 | Kasami ....................... | 375/341 |
| 2009/0103569 A1 * | 4/2009 | Cho et al. .................... | 370/498 |

FOREIGN PATENT DOCUMENTS

| | | |
|---|---|---|
| JP | 10-313284 A | 11/1998 |
| JP | 11-341538 A | 12/1999 |
| JP | 2003-304219 A | 10/2003 |
| JP | 2006-507753 A | 3/2006 |

OTHER PUBLICATIONS

"IEEE std 802.16e(tm)-2005 for Local and metropolitan area networks",Part 16: Air Interface for Fixed and Mobile Broadband Wireless Access Systems; Amendment 2: Physical and Medium Access Control Layers for Combined Fixed and Mobile Operation in Licensed Bands and Corrigendum 1 Feb. 28, 2006.

Japanese Office Action dated Apr. 24, 2012 for corresponding Japanese Application No. 2008-014889, with Partial English-language Translation.

* cited by examiner

*Primary Examiner* — Mark Rinehart
*Assistant Examiner* — Angel Brockman
(74) *Attorney, Agent, or Firm* — Fujitsu Patent Center

(57) ABSTRACT

A synchronization timing detecting method for a receiving device which receives a radio signal including a known symbol on a certain cycle and a gap period which is formed with a certain timing relation based on a transmit timing of the known symbol, wherein synchronization is not achieved in the gap period and the gap period has a longer duration than a certain time, includes receiving the radio signal to detect the gap period in which symbol synchronization is not achieved and which is longer than the certain time, and detecting the known symbol at a timing determined by the certain timing relation based on the gap period detected.

12 Claims, 16 Drawing Sheets

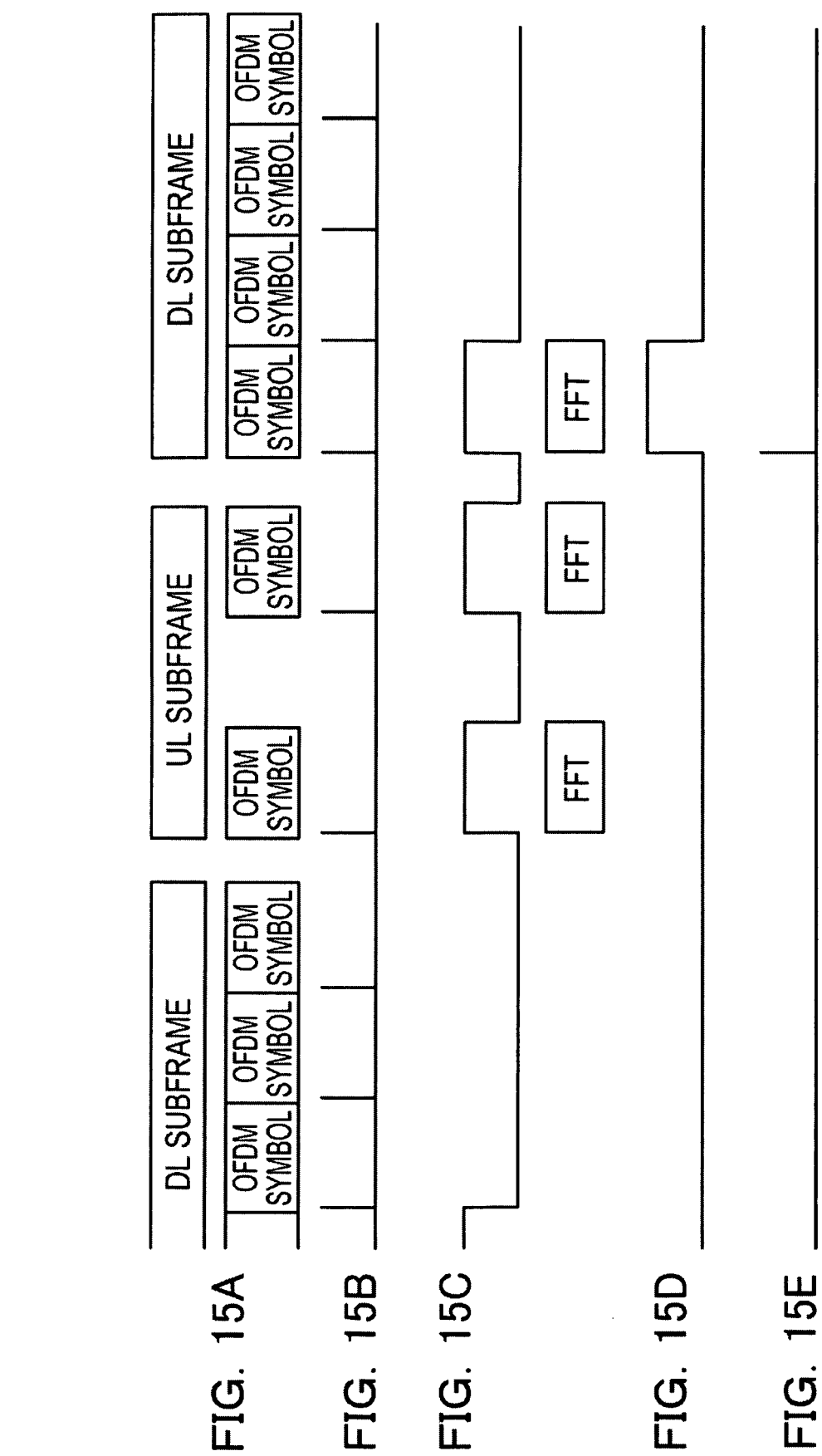

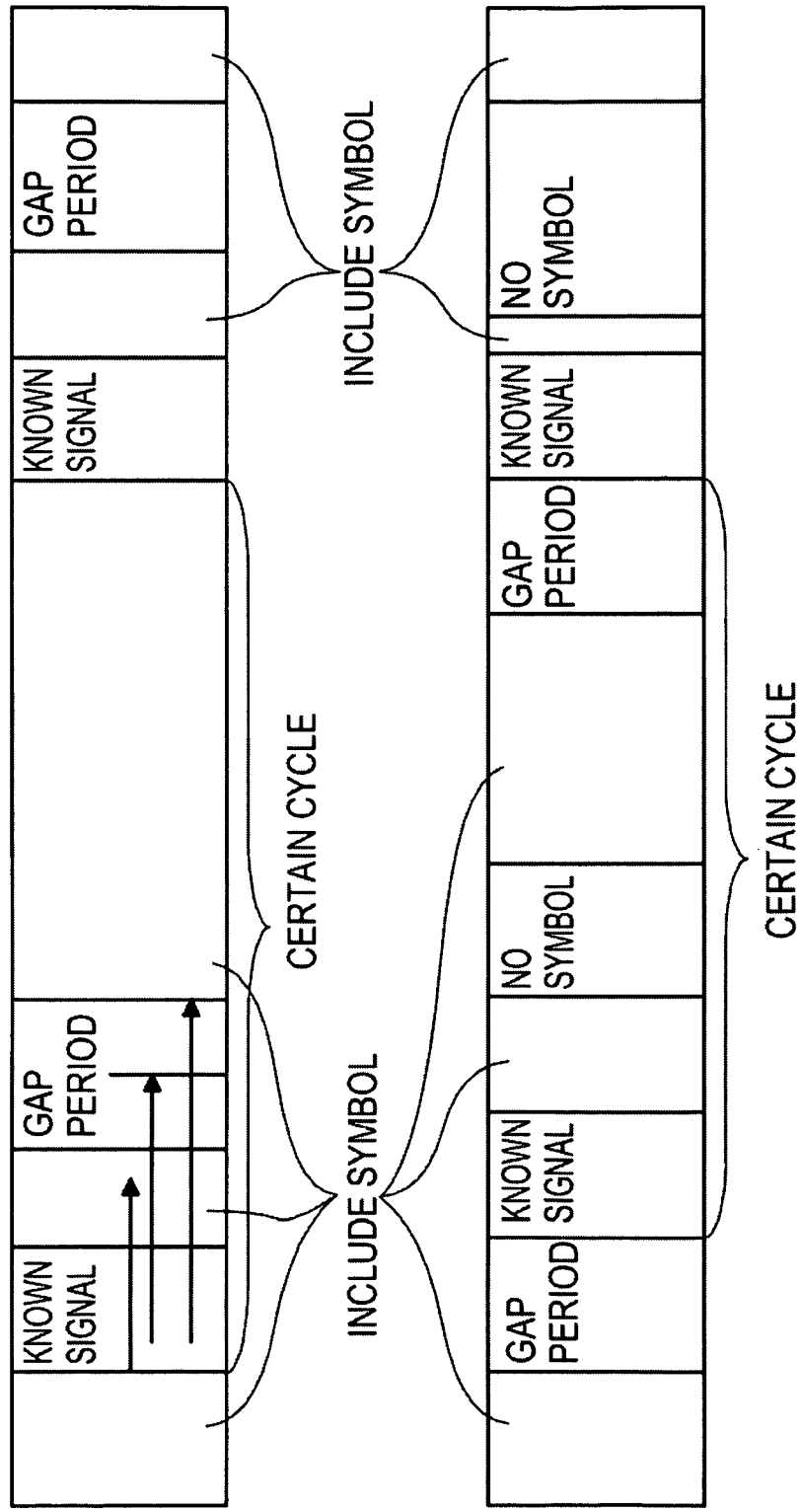

APPARATUS AND METHOD FOR FRAME SYNCHRONIZATION TIMING DETECTION AND MOBILE TERMINAL

CROSS-REFERENCE TO RELATED APPLICATIONS

This application is based upon and claims the benefit of priority of the prior Japanese Patent Application No. 2008-14889, filed on Jan. 25, 2008, the entire contents of which are incorporated herein by reference.

FIELD

Certain aspects of the present invention discussed herein are related to a radio communication technique.

BACKGROUND

A base station and a mobile terminal that perform radio communication using a time division duplex (TDD) method transmit signals in upstream and downstream link directions in a time dividing manner (a same frequency range can be used for transmission and reception). For example, the base station and the mobile terminal perform full-duplex communication by alternately switching between a transmit period of a downstream link direction and a transmit period of an upstream direction within one radio frame. A transmission frame in a time division duplex method includes, for example, a downstream link subframe (DL subframe) with which a signal of a downstream link is transmitted, and an upstream link subframe (UL subframe) with which a signal of an upstream link is transmitted, as illustrated by FIG. 1. Communication systems with these requirements include WiMAX (Worldwide Interoperability for Microwave Access) (see, for example, IEEE 802.16e-2005).

In a time division duplex method, a frame start timing is detected for synchronizing a timing of switching between a transmit period of a downstream link direction and a transmit period of an upstream link direction between a base station and a mobile terminal.

Also, in an orthogonal frequency division multiplexing (OFDM) modulation method, OFDM symbols generated by modulating a plurality of subcarriers are transmitted. In order to demodulate each of the OFDM symbols, a base station and a mobile terminal perform a symbol synchronizing process to detect a symbol start timing, as illustrated by FIG. 2.

At the head of each frame transmitted in time division duplex OFDM modulation communication, a known certain pattern called a "preamble" is included. A receiving device applicable to a time division duplex OFDM modulation communication system will now be described with reference to FIG. 3.

At a symbol start timing detecting portion 12, correlation calculation in a time domain is performed between a cyclic prefix (CP) in an OFDM symbol and a rear portion of an effective symbol from which the CP is copied to detect a start timing of an OFDM symbol. Then, at a frame start timing detecting portion 14, correlation calculation in a frequency domain is performed between each symbol and a preamble pattern to detect a preamble symbol. The frame start timing detecting portion 14 outputs a detection start timing of the preamble symbol as a frame start timing.

In the above-described receiving device, correlation calculation in a frequency domain is performed per symbol. Thus, the amount of correlation calculation is very large.

As an example, a case of a WiMAX receiving device operating at 10 MHz frequency range will now be described with reference to FIG. 4. FIG. 4 illustrates an example of a frame format applicable to WiMAX. As illustrated in FIG. 4, one frame contains a DL subframe and a UL subframe. One frame period is 5 ms, for example. Also, a DL subframe contains 35 OFDM symbols and a UL subframe contains 12 OFDM symbols, for example. One OFDM symbol period is 1,152 Ts, a gap period of switching from transmitting to receiving is 1,104 Ts, and a gap period of switching from receiving to transmitting is 672 Ts, where "Ts" indicates a sample length. For example, a sample length is essentially equal to the reciprocal of a sampling frequency (Fs), which is about 11.2 MHz, and is about 89 ns. The gap of switching from transmitting to receiving may be called TTG (Transmit/Receive Transition Gap), and the gap of switching from receiving to transmitting may be called RTG (Receive/Transmit Transition Gap).

In the frame format illustrated in FIG. 4, the number of OFDM symbols per frame is 47, including OFDM symbols contained in a DL subframe and OFDM symbols contained in a UL subframe. Also, the number of patterns of preambles is 114.

Thus, in this receiving device, correlation calculations are conducted 47×114=5,358 times.

SUMMARY

According to one aspect of the invention, a frame synchronization timing detecting apparatus for detecting a frame synchronization timing of a signal transmitted by a communication device employing an orthogonal frequency division multiplexing method or an orthogonal frequency division multiple access method, includes an elapsed time measuring unit configured to measure an elapsed time between adjacent symbol synchronization timings based on a detected symbol synchronization timing for received signals transmitted according to a time division duplex method; a frame synchronization timing candidate detector configured to detect a symbol that is a candidate for a frame synchronization timing based on the elapsed time measured by the elapsed time measuring unit; and a frame synchronization timing detector configured to detect a frame synchronization timing from the candidate.

According to one aspect of the invention, a frame synchronization timing detecting method for a frame synchronization timing detecting apparatus to detect a frame synchronization timing of a signal transmitted by a communication device employing an orthogonal frequency division multiplexing method or an orthogonal frequency division multiple access method includes receiving the signal transmitted according to a time division duplex method; measuring an elapsed time between adjacent symbol synchronization timings based on a detected symbol synchronization timing for the received signal; detecting a symbol that is a candidate for a frame synchronization timing based on the elapsed time measured; and detecting a frame synchronization timing from the candidate.

According to one aspect of the invention, a synchronization timing detecting method for a receiving device which receives a radio signal including a known symbol on a certain cycle and a gap period which is formed with a certain timing relation based on a transmit timing of the known symbol, in which symbol synchronization is not achieved, and which has a longer duration than a certain time, includes receiving the radio signal to detect a gap period in which symbol synchronization is not achieved and which is longer than the certain time; and detecting the known symbol at a timing determined by the certain timing relation based on the gap period detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is an explanatory diagram of a process of a frame synchronization timing detecting apparatus according to one embodiment of the present invention; and FIG. 16 is an explanatory diagram of a process of a frame synchronization timing detecting apparatus according to one embodiment of the present invention.

DESCRIPTION OF EMBODIMENTS

Embodiments for carrying out the present invention are described with reference to the figures.

First Embodiment

A communication system according to an embodiment of the present invention will be described.

The communication system according to the present embodiment employs a time division duplex (TDD) method.

In TDD, full-duplex communication is performed by swiftly switching between a downstream link and an upstream link. A transmission signal of an upstream link and a transmission signal of a downstream link may also be transmitted in a same transmission frequency range. For example, a transmission frame in a time division duplex method includes a downstream link subframe with which a signal of a downstream link is transmitted and an upstream link subframe with which a signal of an upstream link is transmitted. A downstream link subframe and an upstream link subframe contain a plurality of OFDM symbols. The number of OFDM signal symbols contained in a downstream link subframe and the number of OFDM signal symbols contained in an upstream link subframe may either be the same or different. A cyclic prefix (CP) is placed between OFDM symbols. For example, a CP is placed between symbols by attaching to the head of a symbol a signal that is copied from the back portion of the symbol of a certain length. Also, the communication system according to the present embodiment employs an orthogonal frequency division multiplexing (OFDM) or orthogonal frequency division multiple access (OFDMA) method. Communication systems having these requirements include WiMAX (Worldwide Interoperability for Microwave Access). Thus in the present embodiment, WiMAX (Worldwide Interoperability for Microwave Access) will be described as one example. The present embodiment can be applied to any communication system other than WiMAX as long as the communication system has the above requirements.

Figure 1:
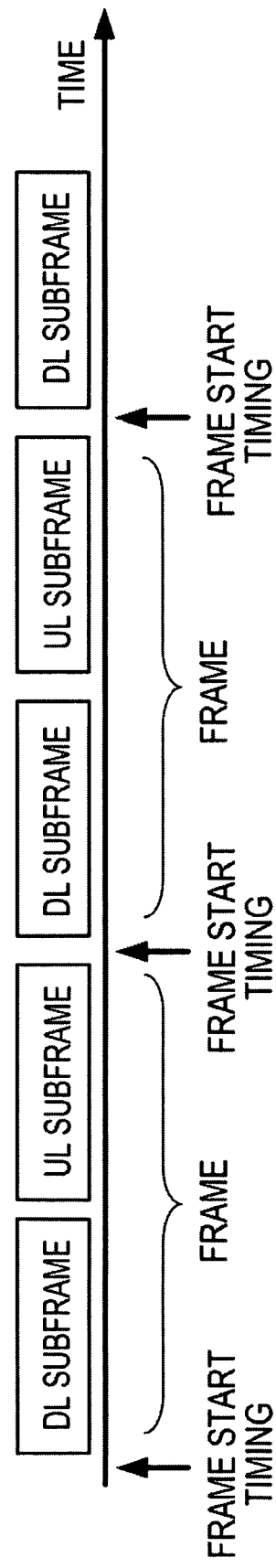
FIG. 1 is a frame format example of a time division duplex method.
Figure 2:
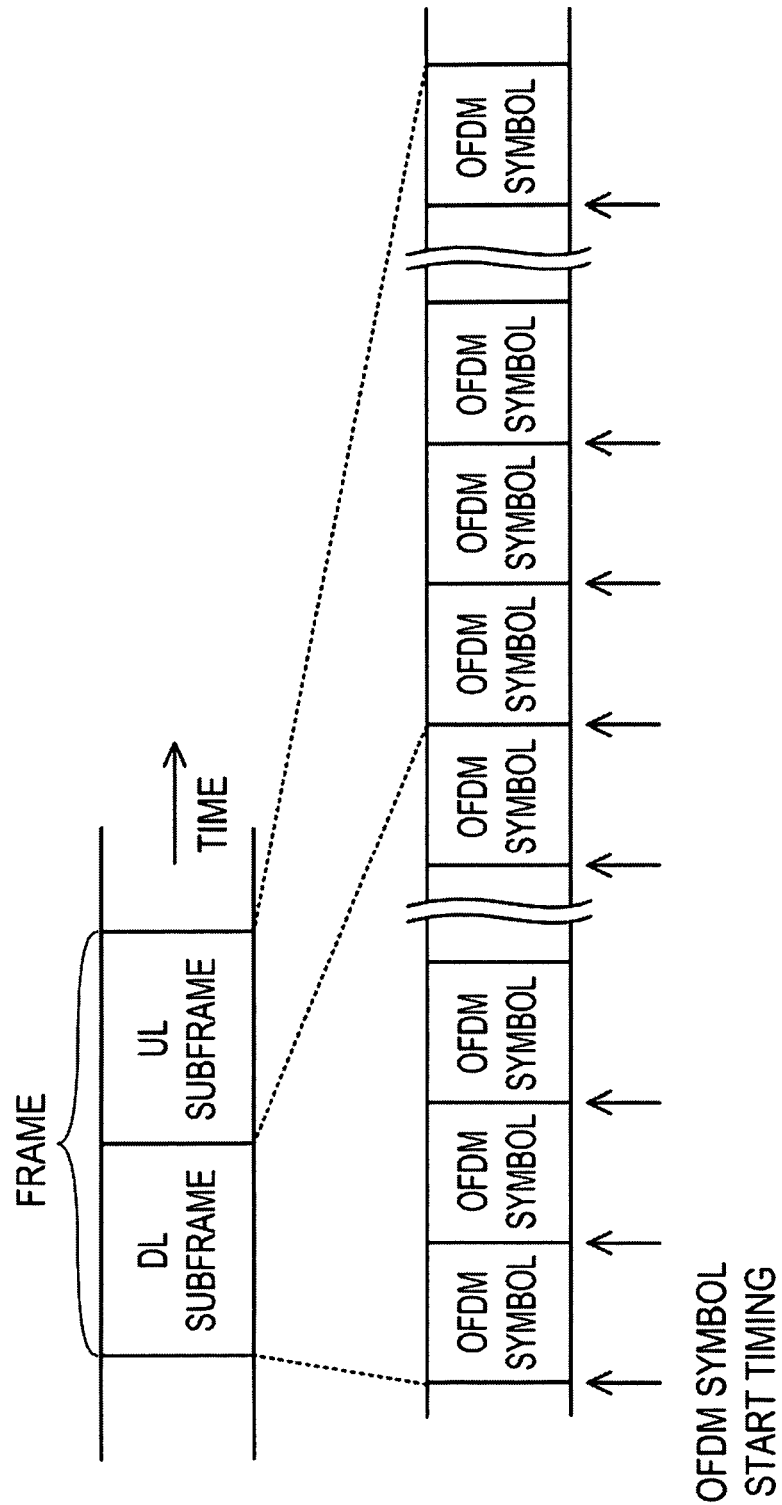
FIG. 2 illustrates an OFDM symbol start timing in a frame format in a time division duplex method.
Figure 3:
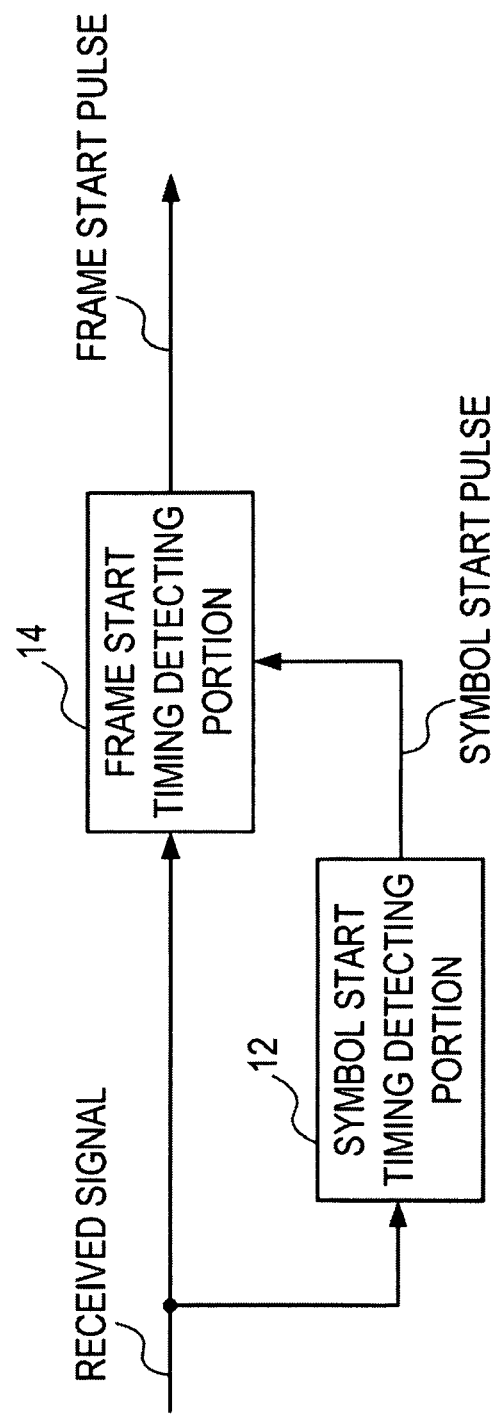
FIG. 3 is a partial block diagram example of a receiving device applicable to a time division duplex OFDM modulation communication system.
Figure 4:
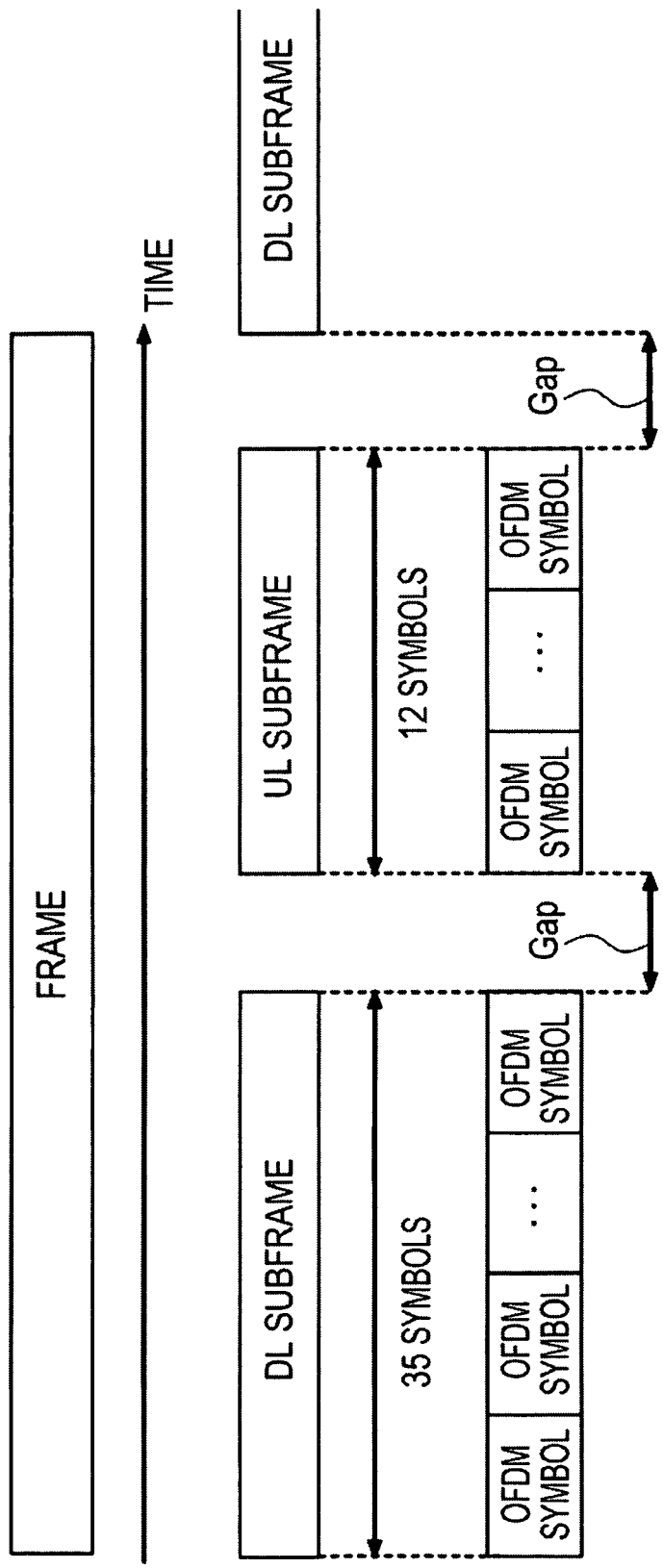
FIG. 4 is a frame format example applicable to WiMAX.

The communication system according to the present embodiment includes a base station device. Also, the communication system according to the present embodiment includes a mobile terminal. The base station device and the mobile terminal perform radio communication using a time division duplex method. A transmission frame in a time division duplex method includes a downstream link subframe (DL) and an upstream link subframe (UL), as described with reference to FIG. 4. A pair of a downstream link subframe and an upstream link subframe is included in one frame. Also, a downstream link subchannel contains a preamble, a frame control header (FCH), a DL-MAP, a UL-MAP, and a downstream link burst (DL burst). A downstream link burst may be classified (divided) into a plurality of areas. An upstream link subchannel contains a ranging area and an upstream link burst (UL burst). An upstream link burst may be classified (divided) into a plurality of areas.

A frame synchronization timing detecting apparatus according to the present embodiment will now be described with reference to FIG. 5. A frame synchronization timing detecting apparatus 100 according to the present embodiment is provided in a communication device such as a mobile terminal device. In other words, a mobile terminal device may have a frame synchronization timing detecting apparatus 100. Specifically, the frame synchronization timing detecting apparatus 100 may be provided in an OFDM transmitting and receiving device. In other words, an OFDM transmitting and receiving device may have a frame synchronization timing detecting apparatus 100.

The frame synchronization timing detecting apparatus 100 according to the present embodiment includes a symbol synchronization timing detecting portion (symbol synchronization timing detector) 102. The symbol synchronization timing detecting portion 102 detects a synchronization timing of an OFDM symbol in a baseband signal sequence by detecting correlation between a cyclic prefix (CP) within an OFDM symbol and the rear portion of an effective symbol from which the CP was copied. A cyclic prefix may be called a "guard interval" (GI). The information of the detected OFDM symbol synchronization timing is input to a symbol synchronization timing fluctuation detecting portion (symbol synchronization timing fluctuation detector) 104 and a frame synchronization timing detecting portion (frame synchronization timing detector) 106 described below. In a radio communication system employing TDD, such as WiMAX, a gap period is formed between a transmit period and a receive period. For example, in WiMAX, in addition to a DL subframe and a UL subframe, a gap of switching from transmitting to receiving (TTG) and a gap of switching from receiving to transmitting (RTG) are included within one frame.

Figure 6:
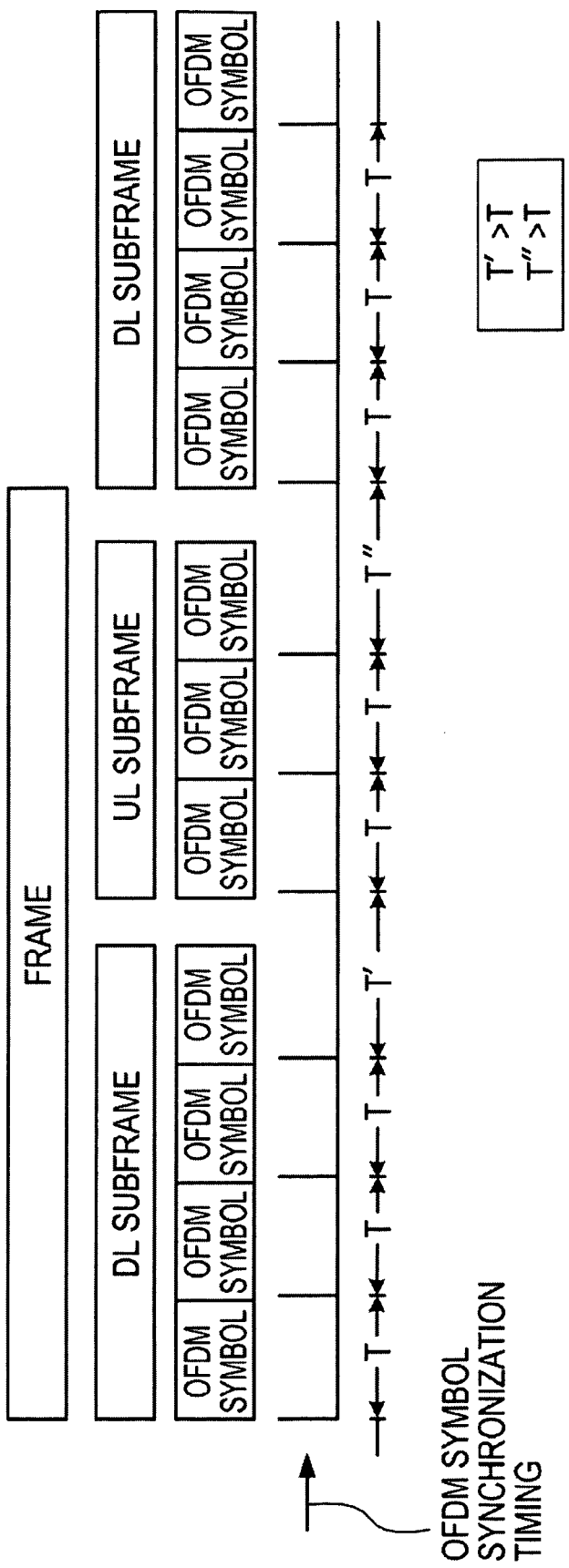
FIG. 6 is an explanatory diagram of a process of a frame synchronization timing detecting apparatus according to one embodiment of the present invention.

Thus, as illustrated by FIG. 6, even though in a DL subframe a symbol synchronization timing cyclically occurs at a certain interval (T) as long as an OFDM symbol exists, at the portion where switching from a DL subframe to a UL subframe occurs, a symbol synchronization timing does not occur at the certain interval (T) because a gap exists. That is, because the symbol synchronization timing adjacent to the symbol synchronization timing of the last OFDM symbol in a DL subframe is the symbol synchronization timing of the first OFDM symbol contained in a UL subframe, the time interval between the adjacent OFDM symbol synchronization timings is a time interval T' (an extended time interval longer than T for at least the amount of a gap period) which is a variation of the certain interval T.

The same is true at the portion where switching from a UL subframe to a DL subframe occurs.

In other words, although the symbol synchronization timings of the OFDM symbols adjacent to a TTG or an RTG, other than the OFDM symbols immediately following the TTG or the RTG, are detected at equal timings (a constant cycle), the symbol synchronization timings of the OFDM symbols immediately following the TTG or the RTG are not detected at the equal timings because these symbol synchronization timings are at least the amount of a TTG or an RTG longer than the immediately preceding OFDM symbol synchronization timings.

The frame synchronization timing detecting apparatus 100 according to the present embodiment includes the symbol synchronization timing fluctuation detecting portion 104. The symbol synchronization timing fluctuation detecting portion 104 calculates, based on the information of an OFDM symbol synchronization timing input by the symbol synchronization timing detecting portion 102, the amount of fluctuation of the OFDM symbol synchronization timing. Also, the symbol synchronization timing fluctuation detecting portion 104 calculates, based on the calculated amount of fluctuation of the OFDM symbol synchronization timing, a priority indicating the priority order with which a frame synchronization timing is detected, and inputs the priority information to the frame synchronization timing detecting portion 106.

The frame synchronization timing detecting apparatus 100 according to the present embodiment includes the frame synchronization timing detecting portion 106. The frame synchronization timing detecting portion 106 performs fast Fourier transformation (FFT) based on the information of an OFDM symbol synchronization timing input by the symbol synchronization timing detecting portion 102 and the priority information input by the symbol synchronization timing fluctuation detecting portion 104. Then, the frame synchronization timing detecting portion 106 detects a frame synchronization timing by performing correlation calculation in a frequency domain with a preamble pattern from an OFDM symbol synchronization timing to detect a preamble.

Figure 7:
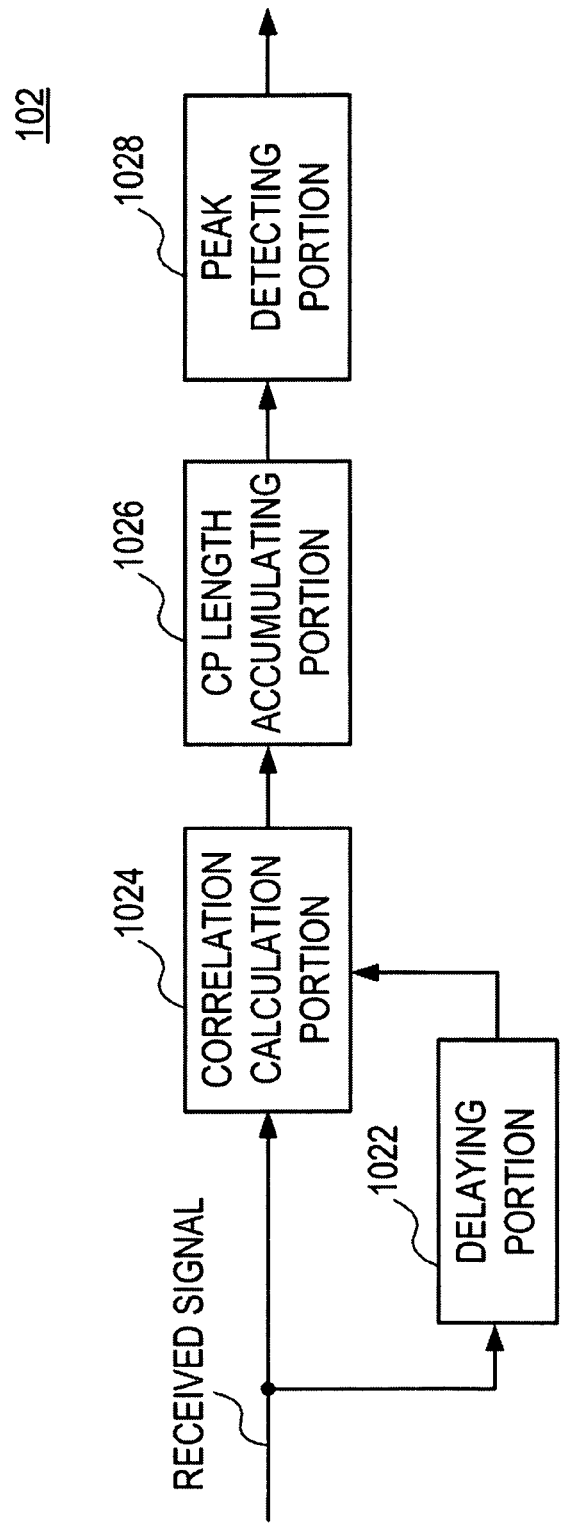
FIG. 7 is a partial block diagram example of a frame synchronization timing detecting apparatus according to one embodiment of the present invention.

The symbol synchronization timing detecting portion 102 in the frame synchronization timing detecting apparatus 100 according to the present embodiment will be described with reference to FIGS. 7 and 8.

The symbol synchronization timing detecting portion 102 includes a delaying portion 1022. The delaying portion 1022 delays a baseband signal sequence by the amount of the length of an effective symbol (the amount of a symbol length not including a CP) contained in one OFDM symbol. The delaying portion may be a memory such as a SRAM which controls interval between writing timing and reading timing for same data to enable desired delay.

Figure 8A:
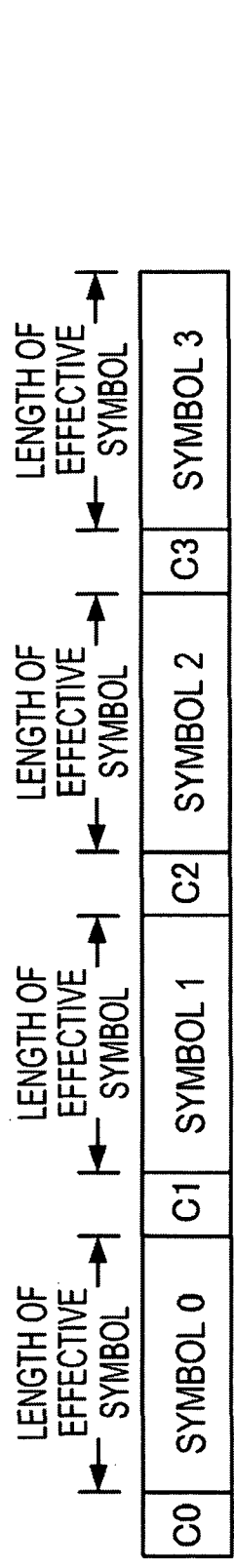
FIG. 8 is an explanatory diagram example of a process of a frame synchronization timing detecting apparatus according to one embodiment of the present invention.
Figure 8B:
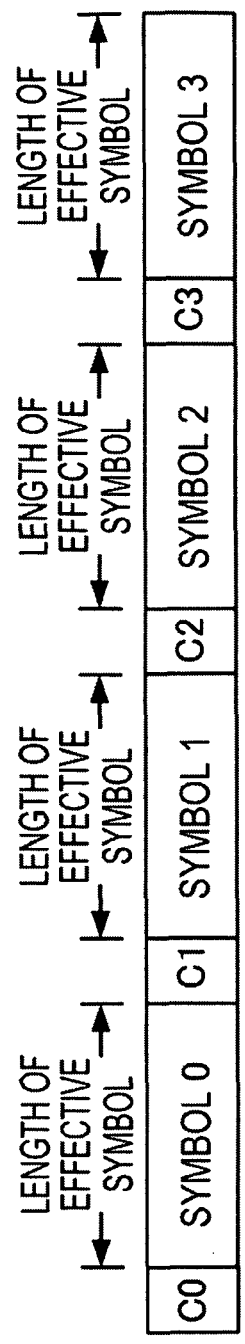

Also the delaying portion 1022 inputs the delayed signal to a correlation calculation portion (correlation calculator) 1024 described below. For example, the delaying portion 1022 delays the baseband signal sequence illustrated in FIG. 8A for the amount of the length of an effective symbol in one OFDM symbol, generates the delayed signal illustrated in 8B, and inputs the delayed signal to the correlation calculation portion 1024. In FIGS. 8A and 8B, "C" (C0, C1, C2, and C3) indicates a CP.

Also, the symbol synchronization timing detecting portion 102 includes the correlation calculation portion 1024. The correlation calculation portion 1024 performs correlation calculation between the delayed signal input by the delaying portion 1022 and the signal being input to the symbol synchronization timing detecting portion 102. Correlation is calculated, for example, per sampling value between the received signal and the received signal delayed at the delaying portion 1022. Also, the correlation calculation portion 1024 inputs a correlation value obtained as a result of the correlation calculation to a CP length accumulating portion (accumulator) 1026 described below.

Figure 8C:

The symbol synchronization timing detecting portion 102 includes the CP length accumulating portion 1026. The CP length accumulating portion 1026 accumulates the correlation value input by the correlation calculation portion 1024 only for the length of a CP. For example, the CP length accumulating portion 1026 performs correlation calculation of the CP portion in an OFDM symbol in a time domain and accumulates the correlation value obtained as a result of the correlation calculation only for the length of a CP. As a result, the correlation value is accumulated as illustrated in FIG. 8C. The CP length accumulating portion 1026 inputs the accumulated correlation value to a peak detecting portion (peak detector) 1028 described below.

The symbol synchronization timing detecting portion 102 includes the peak detecting portion 1028. The peak detecting portion 1028 detects a peak of the accumulated correlation value sequentially input by the CP length accumulating portion 1026. For example, in FIG. 8, a peak is at the trailing end of the C0 because a maximum value can be obtained as a result of accumulation for the length of a CP since correlation can be found from the leading end of the C0 to the trailing end of the C0.

Figure 8D:

Also, the peak detecting portion 1028 determines an OFDM symbol synchronization timing from the time at which a peak of the accumulated correlation value is detected. As a result, as illustrated in FIG. 8D, an OFDM symbol synchronization timing, such as a pulsed waveform indicating a start timing of an OFDM symbol, is obtained. The determined OFDM symbol synchronization timing is input to the symbol synchronization timing fluctuation detecting portion 104 and the frame synchronization timing detecting portion 106.

Figure 9:
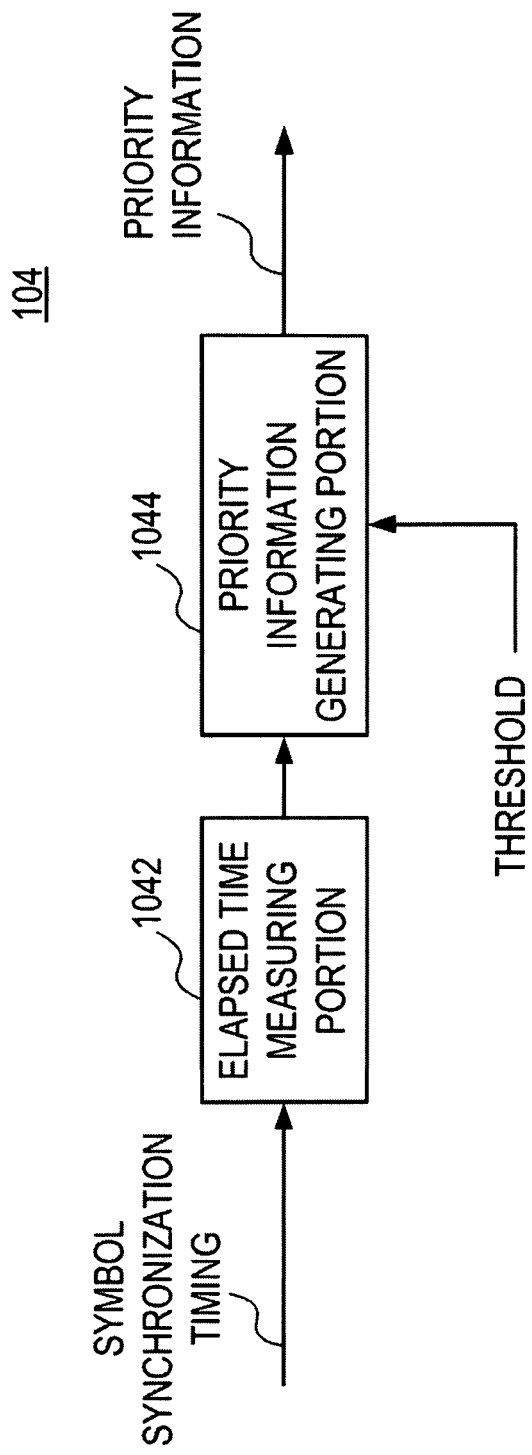
FIG. 9 is a partial block diagram example of a frame synchronization timing detecting apparatus according to one embodiment of the present invention.

The symbol synchronization timing fluctuation detecting portion 104 of the frame synchronization timing detecting apparatus 100 according to the present embodiment will be described with reference to FIGS. 9 and 10.

Figures 10A, 10B:
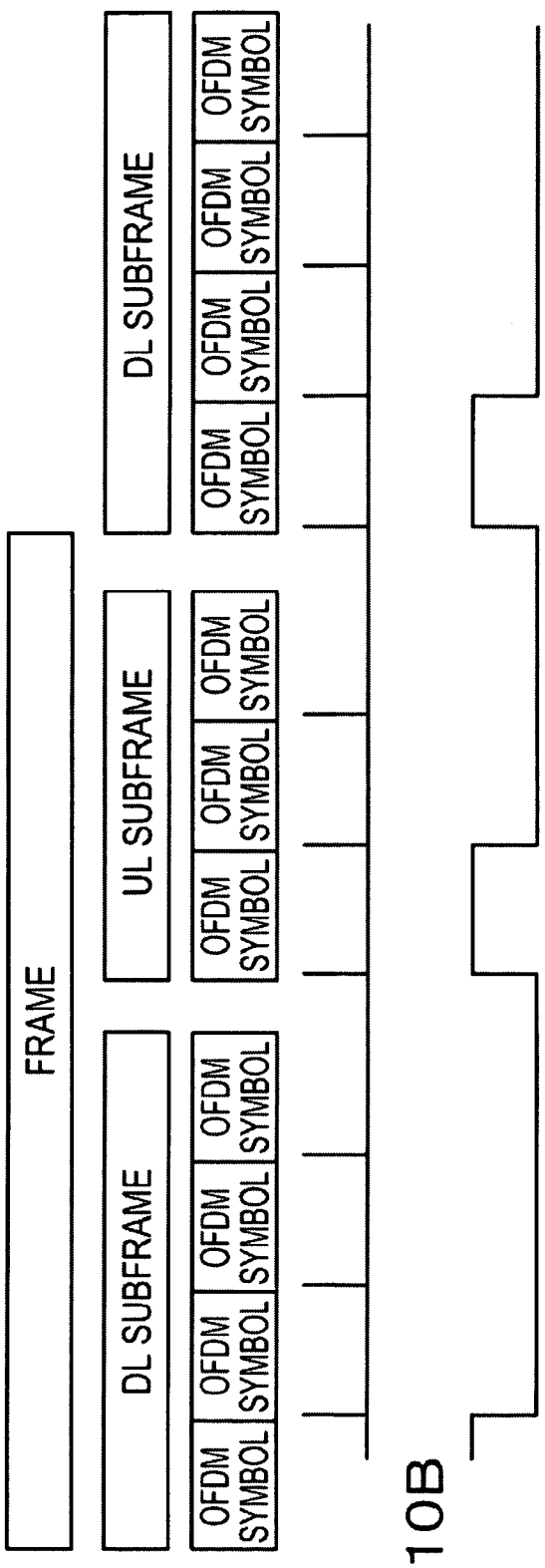
FIG. 10 is an explanatory diagram of a process of a frame synchronization timing detecting apparatus according to one embodiment of the present invention.

The symbol synchronization timing fluctuation detecting portion 104 includes an elapsed time measuring portion (unit) 1042. The elapsed time measuring portion 1042 measures an elapsed time between successive (adjacent) OFDM symbol synchronization timings based on an OFDM symbol synchronization timing input by the symbol synchronization timing detecting portion 102. For example, a pulsed OFDM symbol synchronization timing indicating a start timing of symbol synchronization illustrated in FIG. 10A is input to the elapsed time measuring portion 1042. For example, when an OFDM symbol synchronization timing is input, the elapsed time measuring portion 1042 starts a counter and measures an elapsed time until the next OFDM symbol synchronization timing is input. The information representing the elapsed time measured is input to a priority information generating portion (priority information generator) 1044 described below.

Also, the symbol synchronization timing fluctuation detecting portion 104 includes the priority information generating portion 1044 as a synchronization timing candidate detector. The priority information generating portion 1044 determines, based on the information indicating the elapsed time input by the elapsed time measuring portion 1042, a priority order of OFDM symbols with which correlation calculation in a frequency domain is performed at the frame synchronization timing detecting portion 106, and inputs priority information indicating the priority order to the frame synchronization timing detecting portion 106. For example, a threshold for an elapsed time between OFDM symbol synchronization timings is input to the priority information generating portion 1044. The priority information generating portion 1044 outputs the priority information if the input elapsed time is equal to or higher than the threshold, and does not output the priority information if the input elapsed time is less than the threshold. For example, the threshold for an elapsed time between OFDM symbol synchronization timings is determined based on an OFDM symbol length. For example, the threshold may be set to a value higher than the OFDM symbol length. Also, the threshold may be determined based on the OFDM symbol length as well as the amount of fluctuation in detecting a symbol synchronization timing of the OFDM symbol. Also, the threshold is preferably a value that facilitates the detection of a fluctuation of a symbol synchronization timing due to the gap of switching between transmitting and receiving.

If OFDM symbols contain data (symbols are aligned forward in a temporal direction with no space therebetween), the symbol synchronization timing (T1) corresponding to an OFDM symbol adjacent to and following a TTG, and the symbol synchronization timing (T2) corresponding to an OFDM symbol adjacent to and following an RTG, among OFDM symbols contained in a UL subframe, have different characteristics from other OFDM symbol synchronization timings. That is, while other OFDM symbol synchronization timings are detected when a certain time (T) has elapsed in relation to the immediately preceding symbol synchronization timing, T1 and T2 are detected after a time longer than the certain time (T) has elapsed in relation to the immediately preceding symbol synchronization timing. Because a frame synchronization timing is a symbol synchronization timing corresponding to an OFDM symbol adjacent to and following an RTG, it is preferable to output priority information if a symbol synchronization timing corresponding to an OFDM symbol adjacent to and following the RTG is detected. Thus, priority information is output if an elapsed time is equal to or higher than a threshold. That is, the priority information generating portion 1044 outputs priority information if an elapsed time input by the elapsed time measuring portion 1042 is equal to or higher than a threshold, and does not output the priority information if the elapsed time is less than the threshold, as shown in FIG. 10B.

Figure 11:
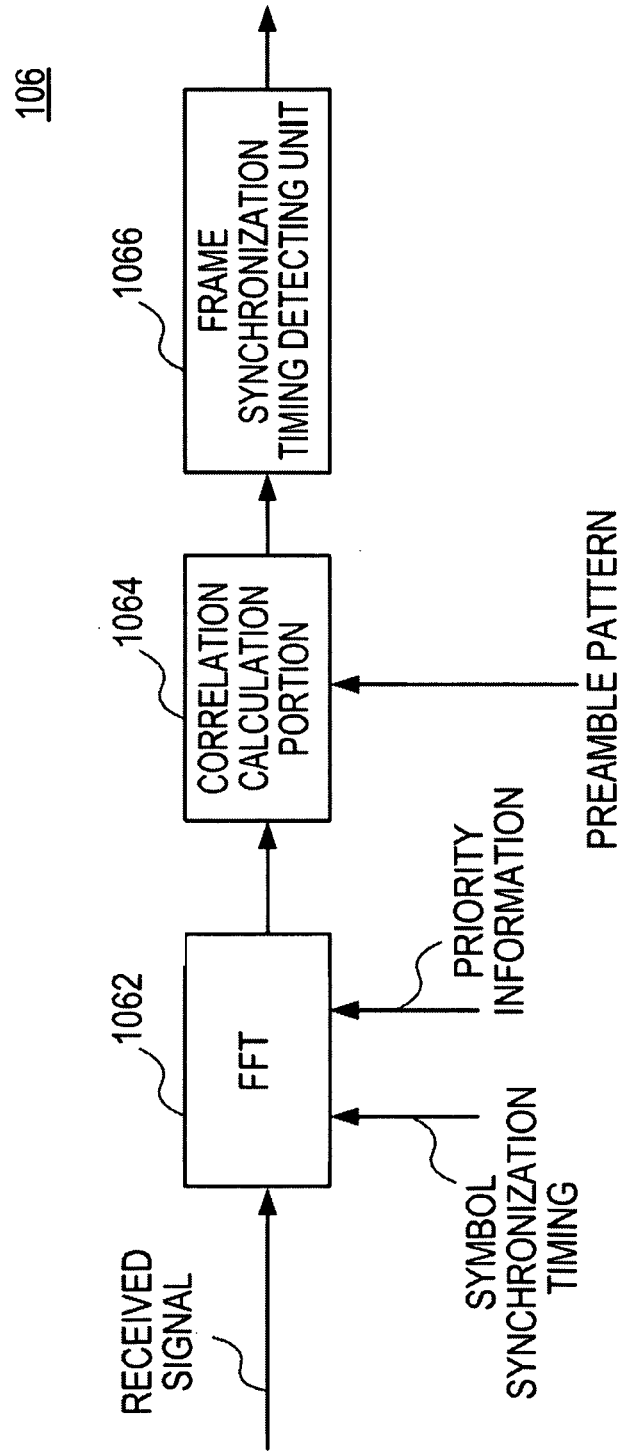
FIG. 11 is a partial block diagram example of a frame synchronization timing detecting apparatus according to one embodiment of the present invention.
Figure 12:
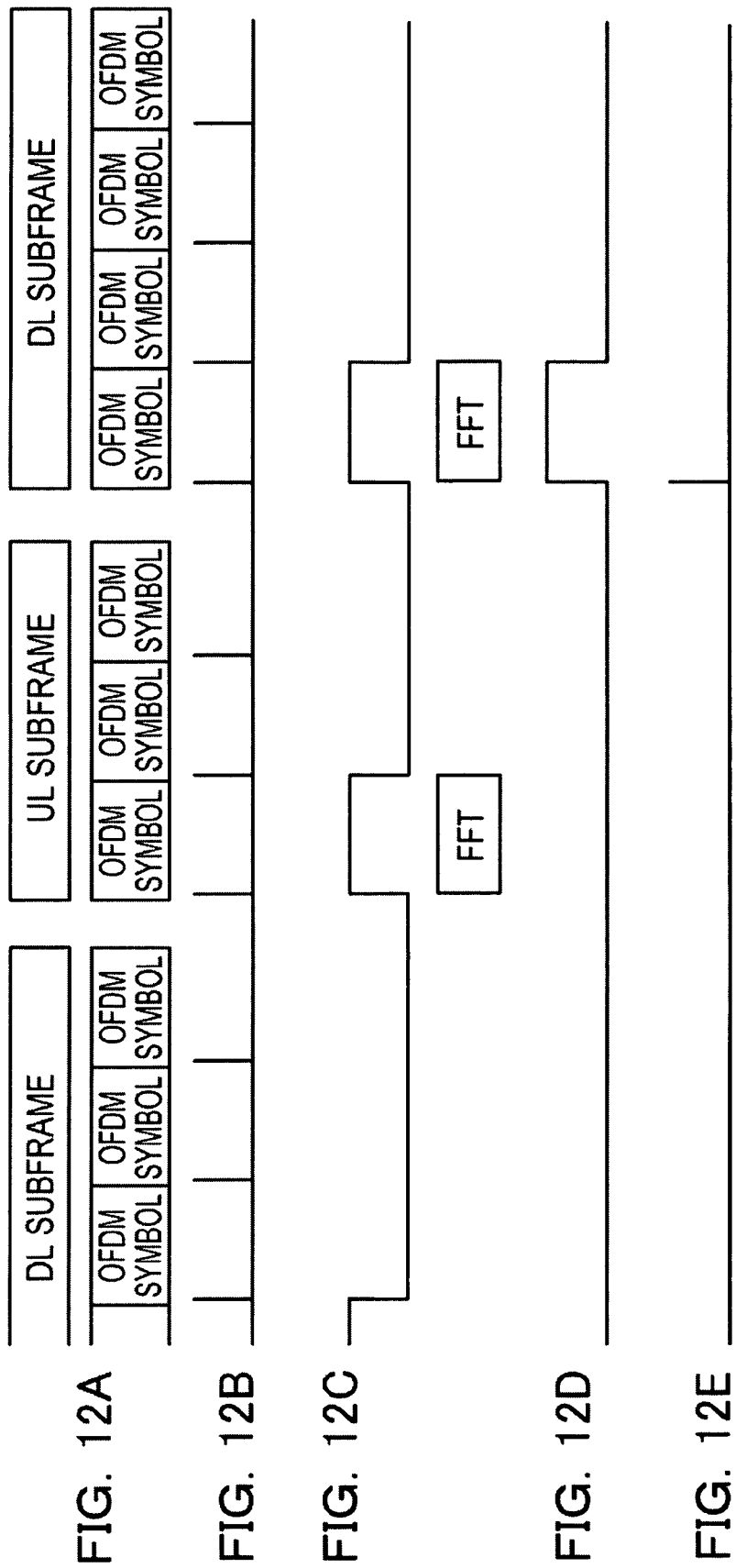
FIG. 12 is an explanatory diagram of a process of a frame synchronization timing detecting apparatus according to one embodiment of the present invention.

The frame synchronization timing detecting portion 106 of the frame synchronization timing detecting apparatus 100 according to the present embodiment will be described with reference to FIGS. 11 and 12.

The frame synchronization timing detecting portion 106 comprises a fast Fourier transform portion (FFT) 1062. A received signal, which is information indicating a symbol synchronization timing input by the symbol synchronization timing detecting portion 102, and the priority information, which is input by the symbol synchronization timing fluctuation detecting portion 104, are input to the FFT 1062. The received signal, the information indicating a symbol synchronization timing, and the priority information are illustrated in FIGS. 12A, 12B, and 12C, respectively. In FIG. 12A, CPs are omitted. The FFT 1062 Fourier-transforms the received signal based on a symbol synchronization timing and the priority information. For example, the FFT 1062 performs Fourier transformation of the OFDM symbol designated by the priority information. For example, Fourier transformation is performed based on the priority information illustrated in FIG. 12C.

Also, the frame synchronization timing detecting portion 106 includes a correlation calculation portion (correlation calculator) 1064. A preamble pattern is input to the correlation calculation portion 1064. The correlation calculation portion 1064 performs correlation calculation between the OFDM symbol Fourier-transformed by the FFT 1062 and a preamble pattern. In this case, correlation calculation between the first OFDM symbol in a UL subframe and a preamble pattern, and correlation calculation between the first OFDM symbol contained in a DL subframe and a preamble pattern is performed. As a result, while a large correlation value is detected for the first OFDM symbol in a DL subframe because the first OFDM symbol in a DL subframe contains the preamble pattern, a large correlation value is not detected for the first OFDM symbol in a UL subframe because the first OFDM symbol in a UL subframe does not contain the preamble pattern.

Also, the correlation calculation portion 1064 calculates the likelihood of a preamble symbol based on the result of the correlation calculation. The calculated likelihood is input to a frame synchronization timing detecting unit 1066. For example, the likelihood information illustrated in FIG. 12D is input to the frame synchronization timing detecting unit 1066. For example, the correlation calculation portion 1064 may output a correlation value as a likelihood.

Also, the frame synchronization timing detecting portion 106 includes the frame synchronization timing detecting unit 1066. The frame synchronization timing detecting unit 1066 calculates and outputs a frame synchronization timing based on the input likelihood. For example, the frame synchronization timing detecting portion 106 may output the start position of the symbol whose likelihood is the highest of all the input likelihoods as a frame synchronization timing. For example, as illustrated in FIG. 12E, based on the likelihood information, the start position of the symbol whose likelihood is the highest is output as a frame synchronization timing.

Although a case in which only two gap periods exist has been described, three or more gap periods may exist within an interval of transmitting a preamble. In this case, although two or more gap periods different from a gap period immediately preceding a preamble may exist, detection of a frame synchronization timing is adequately achieved by correlation detection using a preamble.

In the present embodiment, a case in which two kinds of priority information are output based on one kind of a threshold has been described. In other words, a case in which priority information is output if an elapsed time is equal to or higher than a threshold and not output if an elapsed time is less than a threshold has been described. In this case, the first OFDM symbols in a UL subframe and a DL subframe have higher priorities. With the correlation calculation for these two OFDM symbols in a frequency domain, a frame synchronization timing can be detected. Thus in the present embodiment, a frame synchronization timing can be detected with the correlation calculation for the number of times represented by a product of the number of preamble patterns and two OFDM symbols having a higher priority including the first OFDM symbol in a UL subframe and the first OFDM symbol in a DL subframe. Therefore, the amount of correlation calculation of OFDM symbols performed for detecting a frame synchronization timing can be reduced. For example, if 114 patterns are used as a preamble pattern, a frame synchronization timing can be detected by conducting correlation calculations 114×2=228 times, thus reducing the amount of symbol correlation calculation.

Figure 13:
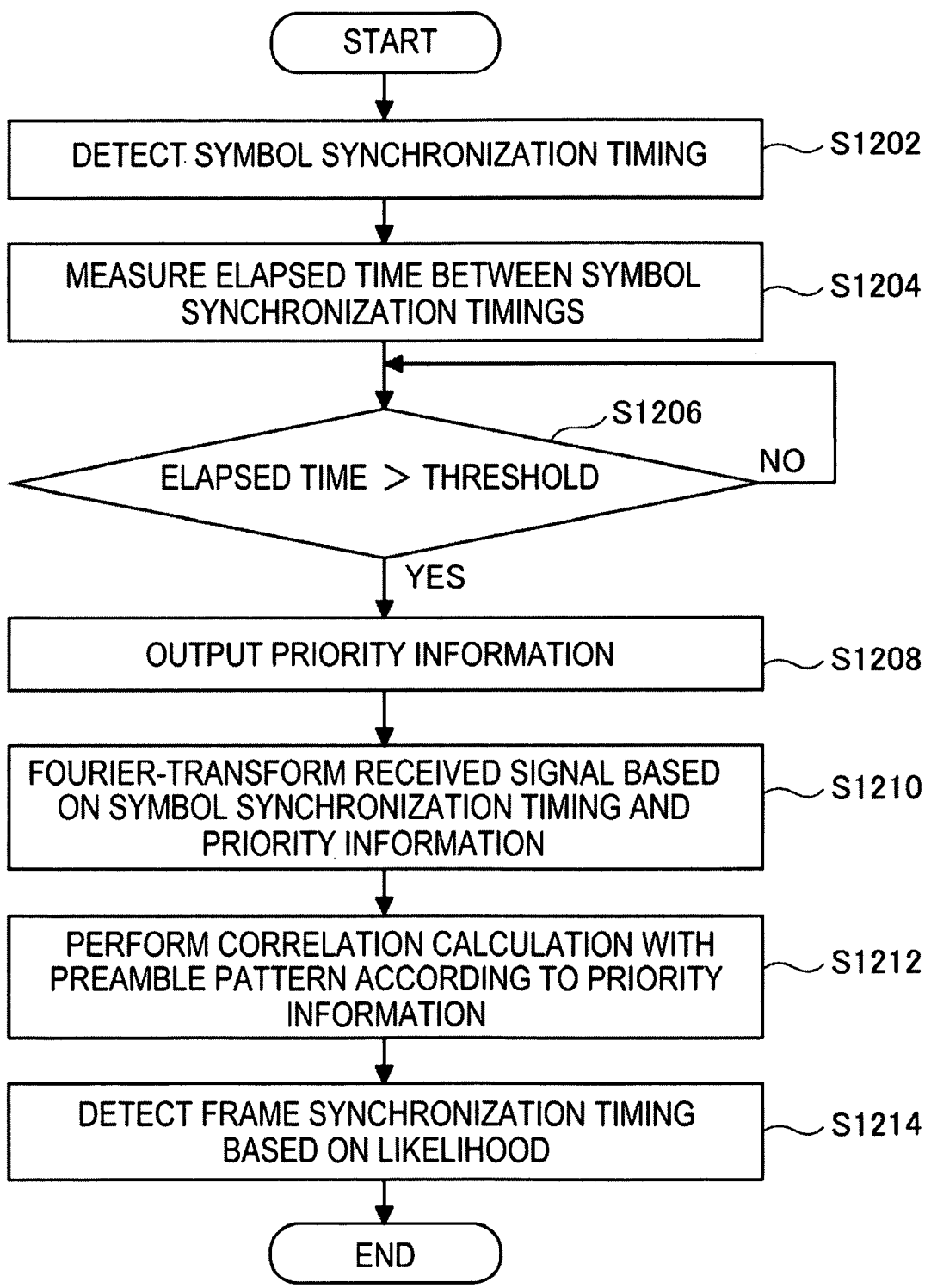
FIG. 13 is a flow chart example of a process of a frame synchronization timing detecting apparatus according to one embodiment of the present invention.

A frame synchronization timing detecting method of the frame synchronization timing detecting apparatus 100 according to the present embodiment will be described with reference to FIG. 13.

The frame synchronization timing detecting apparatus 100 detects a symbol synchronization timing from a received signal (step S1202). Specifically, the symbol synchronization timing detecting portion 102 detects a symbol synchronization timing from a received signal.

The frame synchronization timing detecting apparatus 100 measures an elapsed time between the detected symbol synchronization timings (S1204). Specifically, the symbol synchronization timing fluctuation detecting portion 104 measures an elapsed time between the successive symbol synchronization timings based on the input symbol synchronization timings.

The frame synchronization timing detecting apparatus 100 determines if the measured elapsed time between symbol synchronization timings is higher than a threshold (S1206). Specifically, the symbol synchronization timing fluctuation detecting portion 104 determines if the measured elapsed time between symbol synchronization timings is higher than a certain threshold. This threshold may be determined based on a symbol length, for example.

If the elapsed time between symbol synchronization timings is not determined to be higher than a certain threshold (NO at S1206), the process goes back to S1206. That is, the frame synchronization timing detecting apparatus 100 determines if the next elapsed time between symbol synchronization timings is higher than a threshold.

If the elapsed time between symbol synchronization timings is determined to be higher than a certain threshold (YES at S1206), the frame synchronization timing detecting apparatus 100 performs a process for increasing the priority of the symbol between the symbol synchronization timings. Specifically, the symbol synchronization timing fluctuation detecting portion 104 outputs priority information.

The frame synchronization timing detecting apparatus 100 performs, based on the detected symbol synchronization timing and the priority information, Fourier transformation of the received signal (S1210). Specifically, the frame synchronization timing detecting portion 106 performs, based on the symbol synchronization timing input by the symbol synchronization timing detecting portion 102 and the priority information input by the symbol synchronization timing fluctuation detecting portion 104, Fourier transformation of the OFDM symbol having a higher priority.

The frame synchronization timing detecting apparatus 100 performs correlation calculation between the Fourier-transformed received signal and a preamble pattern according to the priority information (S1212). Specifically, the frame synchronization timing detecting portion 106 performs correlation calculation between the Fourier-transformed received signal and a preamble pattern according to the priority information.

The frame synchronization timing detecting apparatus 100 detects a frame synchronization timing based on a likelihood obtained by correlation calculation (S1214). Specifically, the frame synchronization timing detecting portion 106 detects a frame synchronization timing based on a likelihood obtained by correlation calculation.

Second Embodiment

A communication system according to another embodiment of the present invention will now be described with reference to FIGS. 14 and 15. The communication system according to the present embodiment is similar to the communication system according to the above-described embodiment.

The frame synchronization timing detecting apparatus 100 according to the present embodiment has a configuration similar to the one described with reference to FIGS. 5, 7, 9, and 11.

In the present embodiment, a case in which a symbol synchronization timing cannot be detected in a symbol interval will be described. This case may happen, for example, when a frame with an OFDM symbol containing no data is transmitted or when receiving is failed.

Figures 14A, 14B:
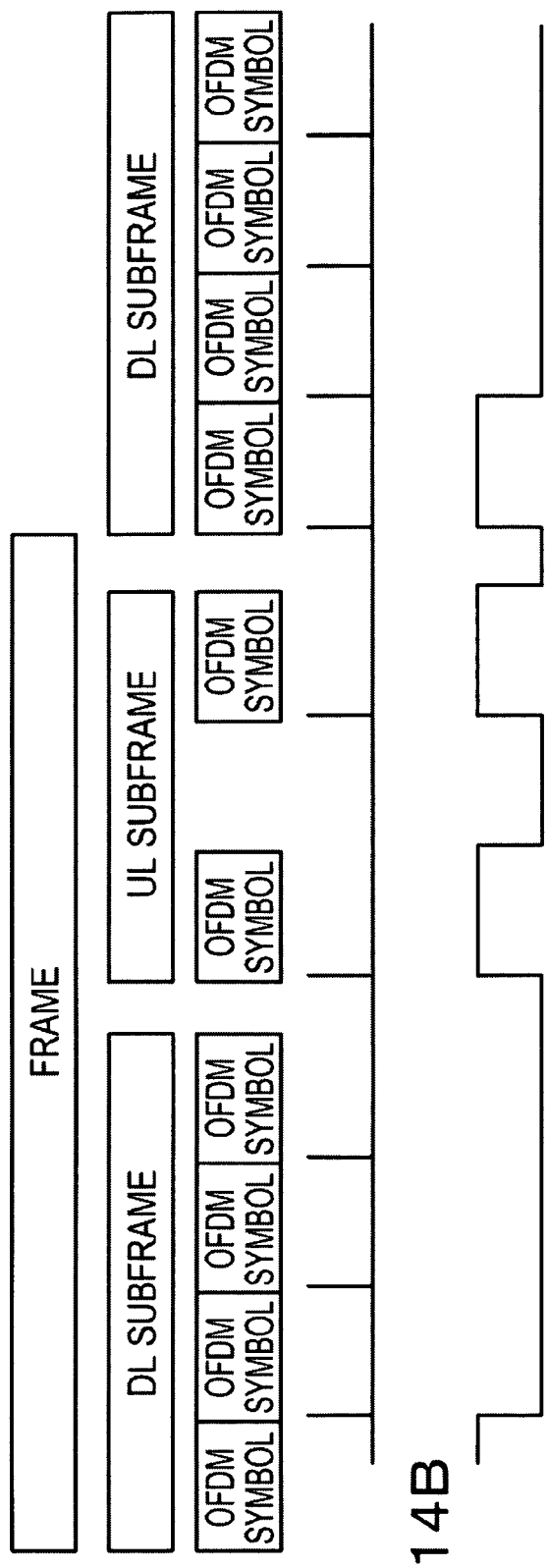
FIG. 14 is an explanatory diagram of a process of a frame synchronization timing detecting apparatus according to one embodiment of the present invention.

The elapsed time measuring portion (unit) 1042 measures an elapsed time between successive OFDM symbol synchronization timings based on an OFDM symbol synchronization timing input by the symbol synchronization timing detecting portion 102. For example, a pulsed OFDM symbol synchronization timing indicating a start timing of symbol synchronization illustrated in FIG. 14A is input to the elapsed time measuring portion 1042. When an OFDM symbol synchronization timing is input, the elapsed time measuring portion 1042 starts a counter and measures an elapsed time until the next OFDM symbol synchronization timing is input. The information indicating the measured elapsed time is input to the priority information generating portion 1044 described below.

The priority information generating portion 1044 determines, based on the information indicating the elapsed time input by the elapsed time measuring portion 1042, a priority with which correlation calculation in a frequency domain is performed in the frame synchronization timing detecting portion 106, and inputs the determined priority information to the frame synchronization timing detecting portion 106. For example, a threshold for an elapsed time between OFDM symbol synchronization timings is input to the priority information generating portion 1044. This threshold may be set, for example, to a value higher than an OFDM symbol length. For example, the threshold may be determined based on the amount of fluctuation in detecting a symbol synchronization timing. In this case, the priority information generating portion 1044 outputs priority information if the elapsed time input by the elapsed time measuring portion 1042 is equal to or higher than the threshold, and does not output priority information if the elapsed time input by the elapsed time measuring portion 1042 is less than the threshold, as illustrated in FIG. 14B. In this case, if priority information is output, that means a priority is high, and if priority information is not output, that means a priority is low. If two levels of a priority are used as with the above-described embodiment, since the elapsed time between symbol synchronization timings corresponding to the OFDM symbol adjacent to and following an OFDM symbol with no data is also equal to or higher than a threshold, the priority of the OFDM symbol adjacent to and following an OFDM symbol with no data is also high. Thus the candidates for a frame synchronization timing are 3 symbols.

A received signal, the information indicating a symbol synchronization timing input by the symbol synchronization timing detecting portion 102, and the priority information, which is input by the symbol synchronization timing fluctuation detecting portion 104, are input to the FFT 1062. The received signal, the information indicating a symbol synchronization timing, and the priority information are illustrated as FIGS. 15A, 15B, and 15C, respectively. In FIG. 15A, CPs are omitted. The FFT 1062 Fourier-transforms the received signal based on a symbol synchronization timing and the priority information. For example, the FFT 1062 performs Fourier transformation in the order of descending priorities. For example, Fourier transformation is performed based on the priority information illustrated in FIG. 15C.

A preamble pattern is input to the correlation calculation portion 1064. The correlation calculation portion 1064 performs correlation calculation between the OFDM symbol Fourier-transformed by the FFT 1062 and the preamble pattern. In this case, correlation calculation between the first OFDM symbol in a UL subframe and a preamble pattern, correlation calculation between the OFDM symbol following an OFDM symbol with no data and a preamble pattern, and correlation calculation between the first OFDM symbol in a DL subframe and a preamble pattern is performed. As a result, while a correlation value is detected for the first OFDM symbol in a DL subframe because the first OFDM symbol in a DL subframe contains a preamble pattern, a correlation value is not detected for the OFDM symbol in a UL subframe and the OFDM symbol immediately following an OFDM symbol with no data because the OFDM symbol in a UL subframe and the OFDM symbol immediately following an OFDM symbol with no data do not contain a preamble pattern.

Also, the correlation calculation portion 1064 calculates the likelihood of a preamble symbol based on the result of correlation calculation. The calculated likelihood is input to the frame synchronization timing detecting unit 1066. For example, the likelihood information illustrated in FIG. 15D is input to the frame synchronization timing detecting unit 1066. For example, the correlation calculation portion 1064 may output a correlation value as a likelihood.

The frame synchronization timing detecting unit 1066 calculates and outputs a frame synchronization timing based on the input likelihood. For example, the frame synchronization timing detecting portion 106 may output the start position of the symbol whose likelihood is the highest of all the input likelihoods as a frame synchronization timing. For example, as illustrated in FIG. 15E, based on the likelihood information, the start position of the symbol whose likelihood is the highest is output as a frame synchronization timing.

In the present embodiment, a case in which two kinds of priority are applied based on one kind of a threshold has been described. In other words, a case in which priority information is output if an elapsed time is equal to or higher than a threshold and not output if an elapsed time is less than a threshold has been described. In this case, the first OFDM symbol in a UL subframe, the OFDM symbol following the interval in which a symbol synchronization timing cannot be detected, and the first OFDM symbol in a DL subframe have higher priorities. With the correlation calculation for these three OFDM symbols in a frequency domain, a frame synchronization timing can be detected. Thus in the present embodiment, a frame synchronization timing can be detected with the correlation calculation performed for the number of times represented by a product of the number of preamble patterns and the number of OFDM symbols having a higher priority, including the first OFDM symbol in a UL subframe, the first OFDM symbol in a DL subframe, and the OFDM symbol following the interval in which a symbol synchronization timing cannot be detected. Therefore, the amount of correlation calculation of OFDM symbols performed for detecting a frame synchronization timing can be reduced. For example, if 114 patterns are included as a preamble pattern, a frame synchronization timing can be detected by conducting correlation calculations 114×3=342 times, thus reducing the amount of symbol correlation calculation.

In the present embodiment, while a case in which a UL subframe contains an OFDM symbol with no data has been described, the same is true for a case in which a DL subframe contains an OFDM symbol with no data.

In the above-described embodiment, while a case in which two kinds of priority information are output based on one kind of threshold has been described, priority may be calculated based on a plurality of thresholds. For example, an OFDM symbol length and a threshold determined based on a gap of switching between transmitting and receiving may be used. For example, a threshold determined based on an OFDM symbol length and a TTG and/or a threshold determined based on an OFDM symbol length and an RTG may be used. Specifically, in addition to a threshold set to an OFDM symbol length, a threshold set to an OFDM symbol length plus a TTG and a threshold set to an OFDM symbol length plus an RTG may be used.

Also, a plurality of priorities may be used. In this case, the correlation calculation portion 1064 performs correlation calculation in the order of descending priorities. As an example, a case in which an OFDM symbol length, an OFDM symbol length plus a TTG, and an OFDM symbol length plus an RTG are used as thresholds and an RTG is larger than a TTG will be described. In this case, it is preferable that an OFDM symbol whose elapsed time is a value of an OFDM symbol length plus an RTG can be detected. Thus, it is preferable to set priorities in ascending order for an OFDM symbol whose elapsed time is equal to or higher than an OFDM symbol length and less than an OFDM symbol length plus a TTG, and an OFDM symbol whose elapsed time is equal to or higher than an OFDM symbol plus TTG and less than an OFDM symbol plus an RTG. A similar method may be applied to a case in which an RTG is less than a TTG.

According to the present embodiment, in an OFDM modulation communication system employing a TDD method, the amount of calculation performed in a symbol synchronization timing detecting circuit can be reduced. Specifically, by performing correlation calculation for two of the symbols included in one frame, a frame synchronization timing can be detected. For example, if one frame is composed of 47 symbols, the maximum reduction amount of correlation calculation is as follows:

$$(47-2)[\text{symbols}]/47[\text{symbols}] \times 10^3 \approx 96[\%]$$

While the embodiments of the present invention have been described, the following case may also be considered as an embodiment.

In this embodiment, a radio signal may be more generally transmitted, as illustrated in FIG. 16. A known signal may be transmitted on a certain cycle as illustrated in FIG. 16. A known signal may be a signal having a certain pattern, such as a preamble signal. Although a gap period forming a period in which symbol synchronization cannot be achieved is formed, at least one gap period may be placed with a certain timing relation based on a known signal. Although symbol synchronization can be achieved in a period having a symbol, it is not possible to use a similar method in a gap period to achieve symbol synchronization. For example, in a gap period, a signal having a different format from a signal in a period having a symbol is transmitted, or transmitting of a signal is not performed. Also, at least one gap period is formed with a certain timing relation to a known signal. In FIG. 16, the positional relation between a known signal and a gap period is made a certain relation by setting the duration from the leading end of a known signal to the leading end of a gap period, by setting the duration from the leading end of a known signal to the middle of a gap period, or by setting the duration from the leading end of a known signal to the trailing end of a gap period to be a certain time. The preamble and the gap period transmitted on a next cycle also have a similar relationship. Of course, a gap period may also be formed immediately preceding a known signal.

Also, a gap period may be set to be longer than a certain duration. It is desirable that a gap period is longer than a plurality of symbol periods. Besides a gap period, a period in which no symbol is transmitted may also exist. This period may also be interpreted as a pseudo-gap period. A pseudo-gap period is called so because there is no guarantee that a pseudo-gap period always has a certain positional relation with a transmission timing of a known signal.

In order to receive such a radio signal and establish synchronization using a known signal (synchronized with the transmitting cycle of a known signal), the above-described method may be used.

First, a radio signal is received and a gap period in which symbol synchronization is not achieved and which is longer than a certain time is detected. Based on a peak detected by the peak detecting portion 1028 illustrated in FIG. 7, the gap period is detected by the symbol synchronization timing fluctuation detecting portion 104 shown in FIG. 5. Here, gaps other than the gap equal to or longer than a certain duration may not be detected. If the minimum duration of the gap period illustrated in FIG. 16 is known, that duration may be used as a threshold to detect a gap period equal to or higher than the threshold.

Figure 5:
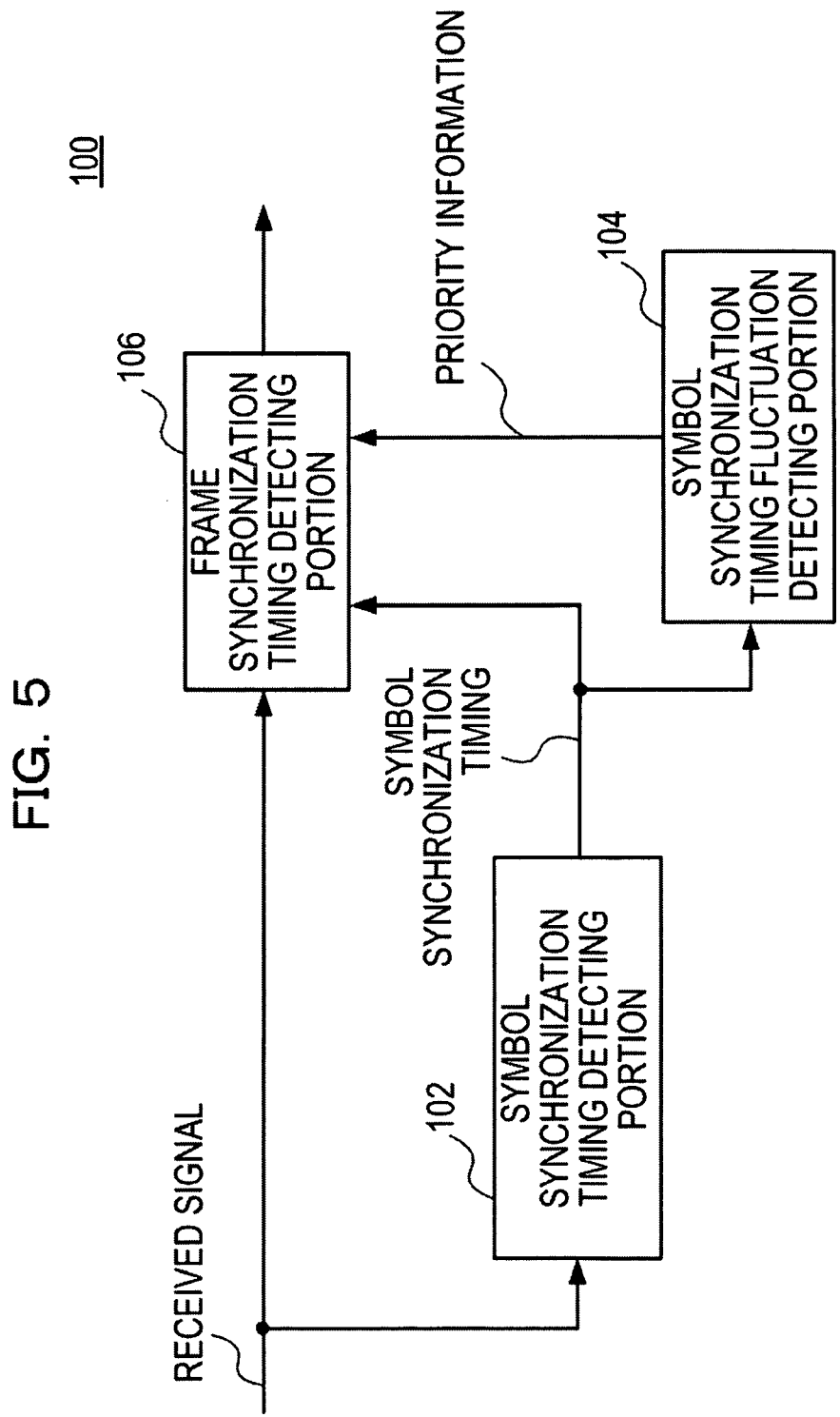
FIG. 5 is a block diagram example of a frame synchronization timing detecting apparatus according to one embodiment.

The frame synchronization timing detecting portion 106 illustrated in FIG. 5 tries to detect a known signal at a timing having a certain timing relation with a gap period (possibly including a pseudo-gap period). That means, the correlation between a known signal and the received signal is calculated at that timing and if the correlation is obtained (a correlation value equal to or higher than a certain value is obtained), that timing is determined to be the transmission timing of the known signal, and synchronization with the known signal is performed. The radio signal may be transmitted in a radio frame according to a TDD method.

According to the above-described embodiment, the amount of correlation calculation of OFDM symbols performed for detecting a frame synchronization timing can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A frame synchronization timing detecting apparatus for detecting a frame synchronization timing of a signal transmitted by a communication device employing an orthogonal frequency division multiplexing method or an orthogonal frequency division multiple access method, the frame synchronization timing detecting apparatus comprising:
   a symbol synchronization timing detector configured to detect a symbol synchronization timing including a first symbol synchronization timing and a second symbol synchronization timing using a correlation calculation;
   an elapsed time measuring unit configured to measure an elapsed time between the first symbol synchronization timing and the second symbol synchronization timing which are included in detected symbol synchronization timings for received signals transmitted according to a time division duplex method, the second symbol synchronization timing being adjacent to the second symbol synchronization timing;
   a frame synchronization timing candidate detector configured to detect a symbol that is a candidate for a frame synchronization timing based on the elapsed time measured by the elapsed time measuring unit and to select a latter symbol synchronization timing of the first symbol synchronization timing and the second symbol synchronization timing as the candidate if the elapsed time measured is equal to or higher than a threshold adjusted in accordance with a frame length; and
   a frame synchronization timing detector configured to detect a frame synchronization timing from the candidate.

2. The frame synchronization timing detecting apparatus according to claim 1, wherein the frame synchronization timing candidate detector determines a priority order of the candidate.

3. The frame synchronization timing detecting apparatus according to claim 1, comprises a Fourier transformer configured to perform Fourier transformation of the received signals based on the symbol synchronization timings and a symbol that is the candidate for a frame synchronization timing, wherein the frame synchronization timing detector performs correlation calculation between the symbol that is the candidate for a frame synchronization timing after the Fourier transformation is performed and a preamble pattern, and detects a frame synchronization timing based on the result of the correlation calculation.

4. The frame synchronization timing detecting apparatus according to claim 3, wherein the Fourier transformer performs Fourier transformation of the received signals based on a priority order of symbols that are frame synchronization timing candidates.

5. The frame synchronization timing detecting apparatus according to claim 1, wherein the frame synchronization timing candidate detector detects a symbol that is the candidate based on a frame length.

6. The frame synchronization timing detecting apparatus according to claim 1, wherein the threshold is determined based on a gap of switching between transmitting and receiving in the time division duplex method.

7. The frame synchronization timing detecting apparatus according to claim 6, wherein the gap of switching between transmitting and receiving includes a gap of switching from transmitting to receiving or a gap of switching from receiving to transmitting.

8. A frame synchronization timing detecting method for a frame synchronization timing detecting apparatus to detect a frame synchronization timing of a signal transmitted by a communication device employing an orthogonal frequency division multiplexing method or an orthogonal frequency division multiple access method, the frame synchronization timing detecting method comprising:

receiving the signal transmitted according to a time division duplex method;

detecting a symbol synchronization timing including a first symbol synchronization timing and a second symbol synchronization timing from the signal using a correlation calculation;

measuring an elapsed time between the first symbol synchronization timing and the second symbol synchronization timing, the second symbol synchronization timing being adjacent to the second symbol synchronization timing;

selecting a latter symbol synchronization timing of the first symbol synchronization timing and the second symbol synchronization timing as a candidate for a frame synchronization timing if the elapsed time measured is equal to or higher than a threshold adjusted in accordance with a frame length; and detecting a frame synchronization timing from the candidate.

9. The frame synchronization timing detecting apparatus according to claim 1, wherein symbol synchronization timing detector includes:

a Fourier transformer configured to perform Fourier transformation on the candidate symbol in response to the symbol synchronization timings; and a correlation calculation circuit configured to perform the correlation calculation on the candidate after the Fourier transformation using a preamble pattern.

10. The frame synchronization timing detecting apparatus according to claim 9, wherein the frame synchronization timing detector detects the symbol having the largest correction value from the candidate.

11. The frame synchronization timing detecting apparatus according to claim 1, wherein a frame specified by the frame synchronization timing including a plurality of symbols each specified by a symbol synchronization timing.

12. A frame synchronization timing detecting method according to claim 8, wherein a frame specified by the frame synchronization timing including a plurality of symbols each specified by a symbol synchronization timing.

* * * * *